United States Patent
Chen et al.

(10) Patent No.: US 9,796,084 B2
(45) Date of Patent: Oct. 24, 2017

(54) ELECTRIC GRIPPER SYSTEM AND CONTROL METHOD THEREOF

(71) Applicant: HIWIN TECHNOLOGIES CORP., Taichung (TW)

(72) Inventors: Wei-Shao Chen, Taichung (TW); Kai-Hsiang Huang, Taichung (TW); I-Hsiang Tseng, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 154 days.

(21) Appl. No.: 14/697,127

(22) Filed: Apr. 27, 2015

(65) Prior Publication Data

US 2016/0311110 A1 Oct. 27, 2016

(51) Int. Cl.
*G06F 19/00* (2011.01)
*B25J 9/16* (2006.01)
*G05B 19/29* (2006.01)

(52) U.S. Cl.
CPC ............ *B25J 9/1612* (2013.01); *G05B 19/29* (2013.01); *G05B 2219/42204* (2013.01); *G05B 2219/42249* (2013.01)

(58) Field of Classification Search
CPC .......... B25J 9/1612; B25J 9/16; G05B 19/29; G05B 19/40; G05B 2219/37023; G05B 2219/41326; G05B 2219/42204; G05B 2219/42249; H02P 8/38
See application file for complete search history.

(56) References Cited

U.S. PATENT DOCUMENTS

| | | | | |
|---|---|---|---|---|
| 4,350,941 A | * | 9/1982 | McClure | G05B 19/232 318/603 |
| 5,048,063 A | * | 9/1991 | Isobe | G05B 19/21 318/638 |
| 7,863,851 B2 | | 1/2011 | Chandhoke | |
| 2006/0145494 A1 | * | 7/2006 | Nihei | B25J 9/1612 294/106 |

OTHER PUBLICATIONS

Biagiotti, Position Force Control of an Arm Gripper System for space manipulation, Jul. 2001, IEEE.*

* cited by examiner

*Primary Examiner* — Rachid Bendidi
(74) *Attorney, Agent, or Firm* — Muncy, Geissler, Olds & Lowe, P.C.

(57) ABSTRACT

An electric gripper system includes a motor driving a gripper mechanism, a sensor, and a controller. The sensor is assembled onto the motor for generating a current position of the gripper mechanism. The controller has a control segment, a transceiver segment, an accessible segment, and a driving segment. The control segment generates a target position according to a relative-position command value of the transceiver segment and an absolute cumulative position of the accessible segment. The control segment generates a driving datum based on a difference between the current position and the target position, and on a rotation rate of the motor. The driving segment uses the driving datum to drive the motor to move the gripper mechanism. With calculation among the relative-position command value, the absolute cumulative position, and the current position, the motor is prevented from accumulating positional deviation.

4 Claims, 4 Drawing Sheets

ELECTRIC GRIPPER SYSTEM AND CONTROL METHOD THEREOF

BACKGROUND OF THE INVENTION

1. Technical Field

The present invention relates to an electric gripper system and a control method thereof, and is applicable to an electric gripper for improving the gripper mechanism in terms of positioning accuracy.

2. Description of Related Art

Electric grippers have been extensively used in automated industry for gripping workpieces to be assembled. However, the existing electric gripper tends to have a minor positional deviation from the targeted site every time it moves. Such positional deviation can continuously accumulate. Over time, the electric gripper the difference between the actually reached site and the targeted site can become significant. As a result, the workpiece it holds can leave its intended route and collide with the workpieces on which it is to be assembled.

As disclosed in U.S. Pat. No. 7,863,851, the positional deviation generated when an electric gripper moves is offset. This prior-art device has a first axis for generating a control command that drives a step motor, and a second axis for generating a correct position. Therein, the second axis generates a velocity-curve compensation value according to the position of the motor fed back to it, and then generates a composite command for the step motor by computing the velocity curve compensation value and the control command originally generated by the first axis, thereby compensating the positional deviation of the step motor.

In the prior art as stated above, while it is possible to improve of the accuracy of each-time displacement of the step motor by feeding back the step motor's current position, there is no means to compensate cumulative deviation that results from individual minor positional deviation over several times of the step motor's movement.

BRIEF SUMMARY OF THE INVENTION

In view of this, the primary objective of the present invention is to provide an electric gripper system and a control method thereof that prevent an electric gripper from generating cumulative positional deviation, thereby ensuring that the electric gripper can accurately move to a targeted position.

For achieving the foregoing objective, the disclosed electric gripper system for controlling a gripper mechanism to hold a workpiece comprised: a motor, a sensor, and a controller. The motor serves to drive the gripper mechanism to hold the workpiece. The sensor is assembled onto the motor so as to generate a current position according to a position of the gripper mechanism.

The controller comprises a control segment, a transceiver segment, an accessible segment, and a driving segment. The transceiver segment generates a relative-position command value that makes the gripper mechanism move with a relative position. The accessible segment stores an absolute cumulative position. The control segment receives a relative-position command value of the transceiver segment and the absolute cumulative position of the accessible segment. The control segment generates a target position according to the relative-position command value and the absolute cumulative position. The control segment generates a driving datum according to a difference between the current position and the target position, and according to a rotation rate of the motor. The driving segment read the driving datum to drive the motor to move the gripper mechanism. Thereby, the driving segment according to the driving datum drives the motor to use a proper rotation rate to make the gripper mechanism move to the target position with the relative-position command value, thereby eliminating positional deviation that may otherwise appear during the movement of the gripper mechanism.

Also provided is a control method of an electric gripper system, which comprises the following steps: a) the control segment receiving the relative-position command value from the transceiver segment, and obtaining the absolute cumulative position from the accessible segment, and the control segment generating the target position based on the relative-position command value and the absolute cumulative position; b) the control segment receiving the current position generated by the sensor, and calculating a distance between the current position and the target position, the control segment generating the driving datum based on the distance between the current position and the target position and on the rotation rate of the motor; c) the driving segment receiving the driving datum, the driving segment driving the motor according to the driving datum to make the gripper mechanism move toward the target position; and d) the control segment determining whether the gripper mechanism has entered a positioning range, and when the gripper mechanism has entered the positioning range, determining that the gripper mechanism has been positioned; otherwise, returning to Step b).

With the calculation among the relative-position command value, the cumulative position, and the current position, the motor according to the driving datum uses a proper rotation rate to control the gripper mechanism to move toward the target position, so as to compensate the positional deviation generated by the gripper mechanism, thereby improving the gripper mechanism in terms of positioning accuracy.

For further illustrating the means and functions by which the electric gripper system and the control method disclosed by the present invention achieve the certain objectives, the following description, in conjunction with the accompanying drawings and preferred embodiments, is set forth as below to illustrate the implement, structure, features and effects of the subject matter of the present invention, but not intended to limit the scope of the present invention.

DETAILED DESCRIPTION OF THE INVENTION

The invention as well as a preferred mode of use, further objectives and advantages thereof will be best understood by reference to the following detailed description of illustrative embodiments when read in conjunction with the accompanying drawings.

Figure 1:
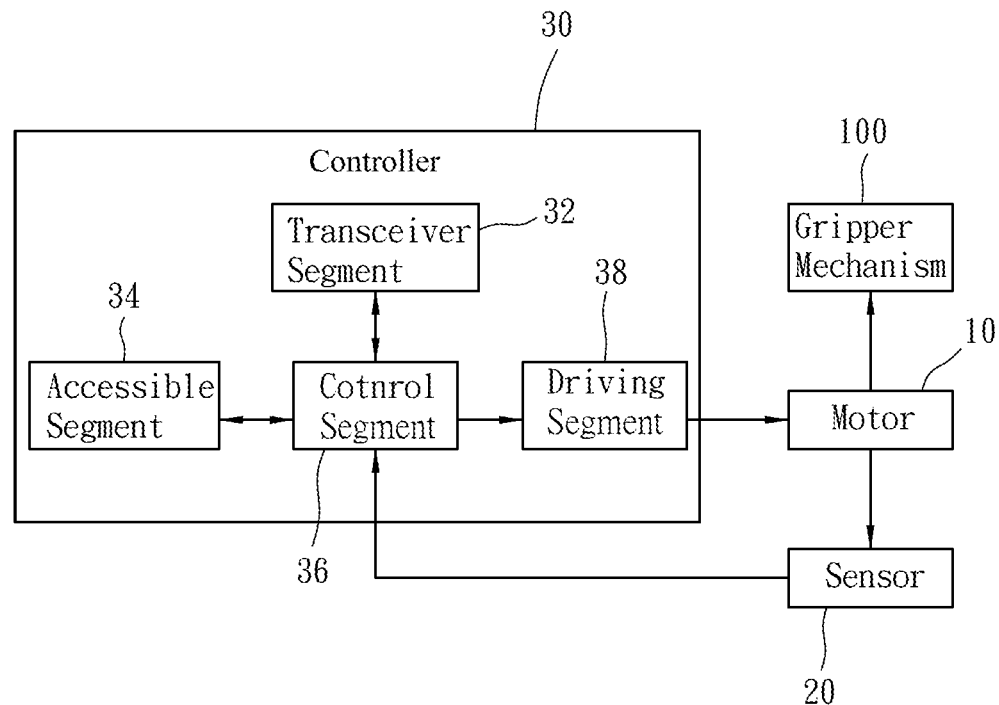
FIG. 1 is a block diagram illustrating an electric gripper system according to one preferred embodiment of the present invention.
Figure 2:
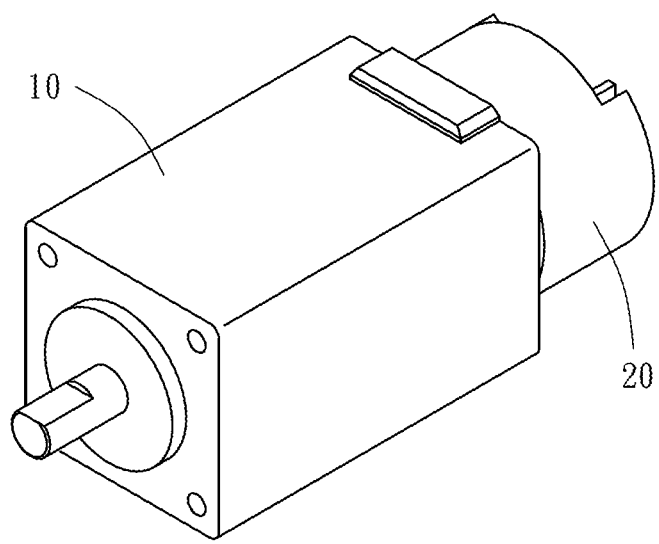
FIG. 2 is a perspective view of a motor with a sensor of the electric gripper system of FIG. 1 assembled thereon.

Referring to FIG. 1 and FIG. 2, an electric gripper system according to one preferred embodiment of the present invention serves to drive a gripper mechanism 100 to perform displacement. The electric gripper system comprises a motor 10, a sensor 20, and a controller 30. The motor 10 serves to drive the gripper mechanism 100 to perform displacement.

As shown in FIG. 1, the sensor 20 is assembled onto the motor 10. The sensor 20 generates a current position of the gripper mechanism 100 according to the position of the gripper mechanism 100.

The controller 30 comprises a transceiver segment 32, an accessible segment 34, a control segment 36, and a driving segment 38. The control segment 36 is connected to the transceiver segment 32, the accessible segment 34, the driving segment 38, and the sensor 20. The transceiver segment 32 generates a relative-position command value. The accessible segment 34 stores an absolute cumulative position. The relative-position command value directs the motor 10 to drive the gripper mechanism 100 to move under a relative position mode.

The control segment 36 reads the relative-position command value, the absolute cumulative position, and the current position. The control segment 36 generates a target position based on the relative-position command value and the absolute cumulative position. The control segment 36 uses a distance between the current position and the target position, and uses the rotation rate of the motor 10 (deceleration or acceleration) to generate a driving datum. The driving datum is a velocity curve.

The driving segment 38 reads the velocity curve, and converts the acceleration curve into an electric signal (i.e. a current or a voltage), so as to drive the motor 10 to move the gripper mechanism 100.

Figure 3:
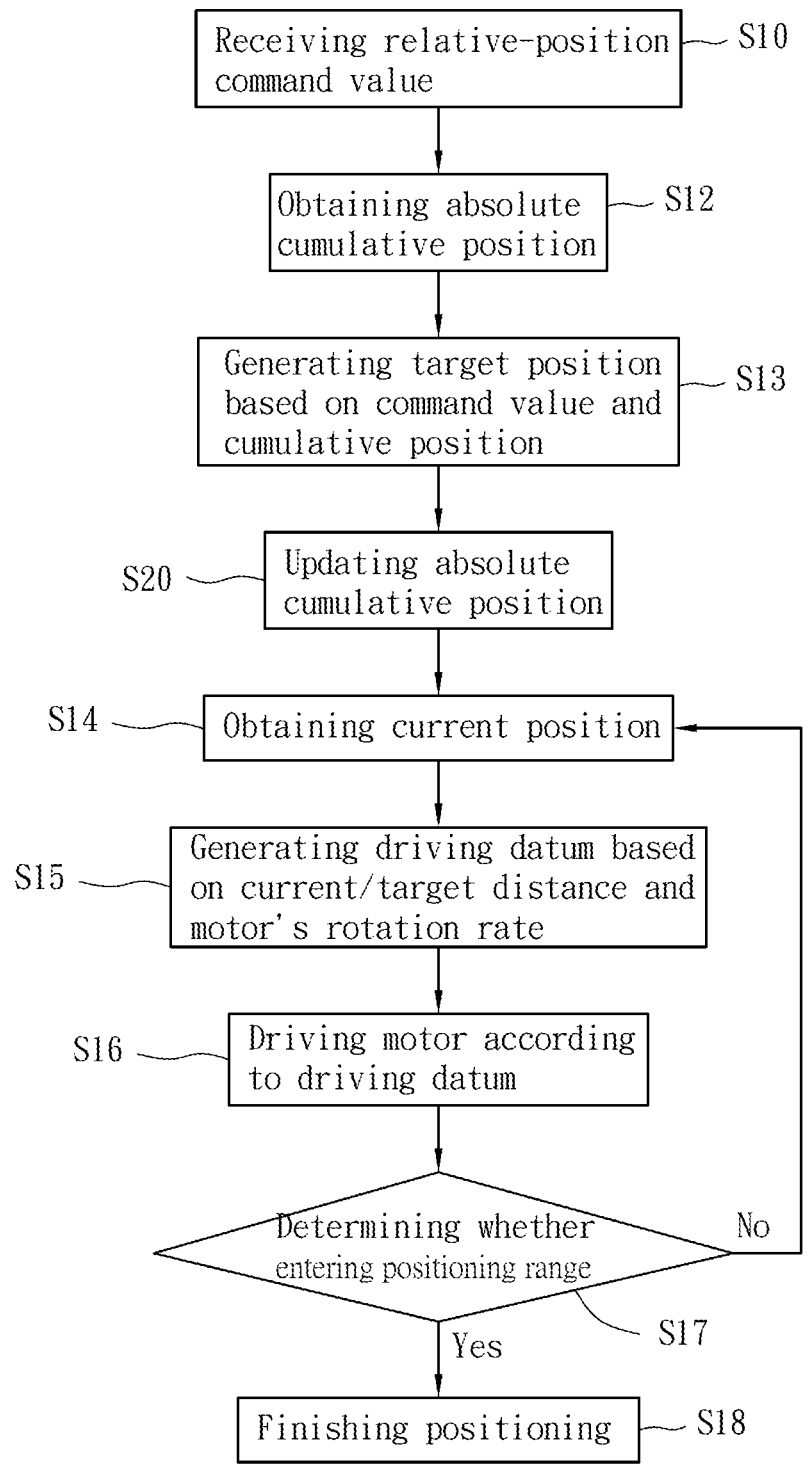
FIG. 3 is a flowchart of a method for controlling the electric gripper system of FIG. 1.

Please refer to FIG. 2 and FIG. 3. According to the above description of the electric gripper system of the preferred embodiment of the present invention, a control method for the system is described below as a series of steps.

First, in Step S10, the control segment 36 receives the relative-position command value from the transceiver segment 32. Then in Step S12, the control segment 36 obtains the absolute cumulative position from the accessible segment 34. In Step S13, the control segment 36 adds the relative-position command value and the absolute cumulative position together to generate a target position. The absolute cumulative position is the current position of the gripper mechanism 100 in an ideal situation. The relative-position command value is the distance for the gripper mechanism 100 to move. The absolute cumulative position is the current position of the gripper mechanism 100 in an ideal situation, and the initial state of the absolute cumulative position is default.

Step S20 is about updating the absolute position. The sum of the relative-position command value and the absolute cumulative position that is previously stored in the accessible segment 34 is used to replace the absolute cumulative position previously stored in the accessible segment 34. Thereby, after the motor 10 drives the gripper mechanism 100, the new absolute cumulative position is the current position of the gripper mechanism 100 in an ideal situation. The ideal current position is a position reached by the gripper mechanism 100 that moves without any distance deviation. With the step that updates the absolute cumulative position, any positional deviation of the gripper mechanism 100 after movement can be eliminated.

In Step S14, the control segment 36 receives the current position generated by the sensor 20. In Step S15, the control segment 36 calculates the difference between the current position and the target position, as well as the rotation rate of the motor 10, so as to generate a driving datum. By calculating the difference between the current position and the target position, the positional deviation generated in the previous movement of the gripper mechanism 100 can be compensated, thereby allowing the gripper mechanism 100 to accurately arrive at the target position.

Then in Step S16, the control segment 36 sends the driving datum to the driving segment 38. After the driving segment 38 receives the driving datum, the driving motor 10 drives the gripper mechanism 100 to move toward the target position. In Step S17, the control segment 36 determines whether the motor 10 has entered a positioning range. When the control segment 36 determines that the motor 10 has entered the positioning range, the positioning of the motor 10 is finished (i.e. Step S18). When the control segment 36 determines that the motor 10 has not entered the positioning range, the method returns to Step S14, where the control segment 36 re-obtains the current position of the motor 10, and Step S14 through Step S17 are circulatively repeated, until the motor 10 has entered the positioning range. Therein, the positioning range is the specification tolerance of the workpiece.

During the movement of the gripper mechanism 100, it can move to the target position under either an absolute position mode or a gripping mode. The gripper mechanism 100 is switched between the moving modes. As how to switch the gripper mechanism 100 absolute position mode is known to people skilled in the art and is not a feature of the present invention, no detailed description is provided thereto in this specification. The gripper mechanism 100 has two modes of movement, namely relative position movement and absolute position movement. While relative position movement is about making the gripper mechanism 100 move for a fixed distance and arrive at the target position, absolute position movement is about making the gripper mechanism 100 move to the target position. For instance, when the target position is 3 mm far from an origin and the current position of the gripper mechanism 100 is 1 mm far from the same origin and collinear to the target position, if the gripper mechanism 100 moves with a relative position command, the command direct the gripper mechanism 100 to move 2 mm forward, and if the gripper mechanism 100 moves with an absolute position command, the command direct the gripper mechanism 100 to move to the position 3 mm far from the origin.

Figure 4:
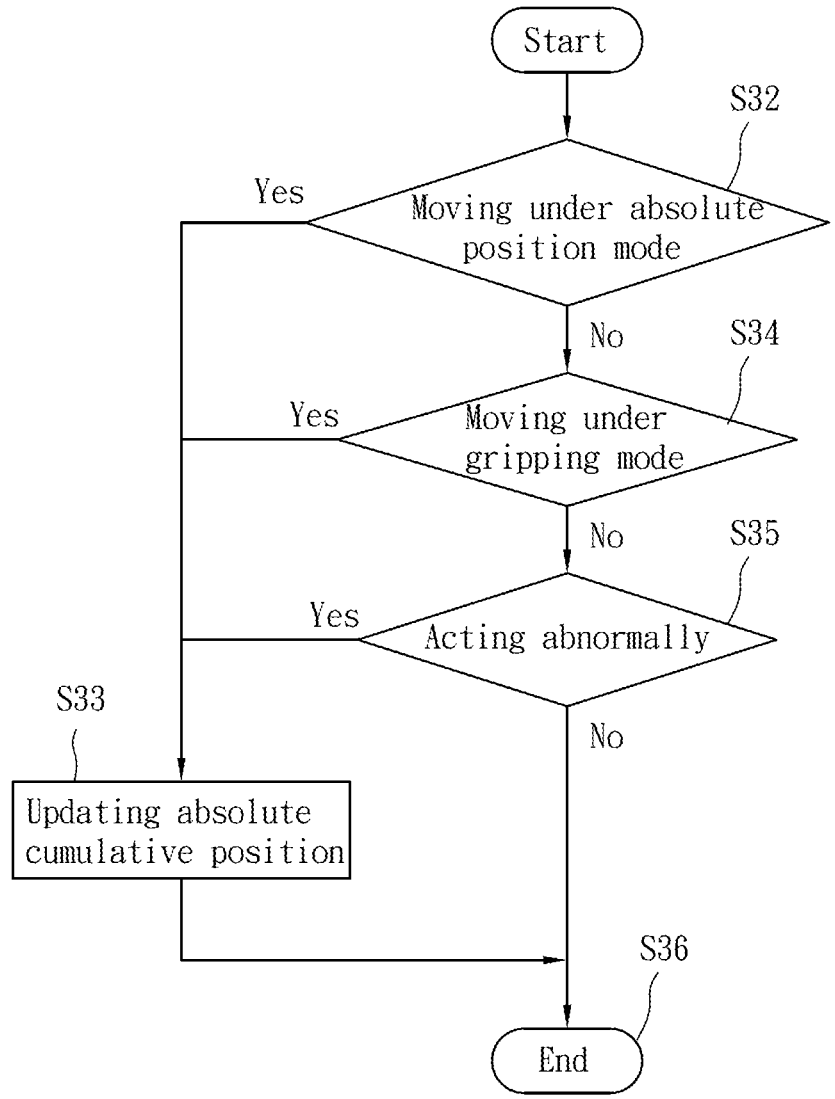
FIG. 4 is a flowchart of the step for updating the absolute cumulative position according to FIG. 3.
Figure 5:
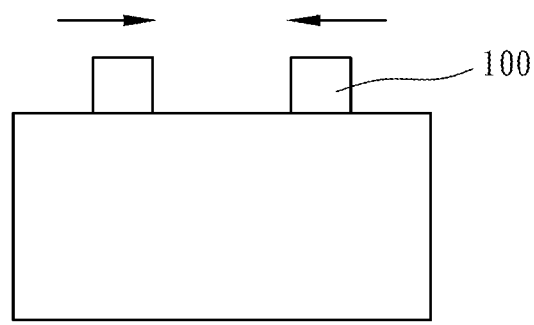
FIG. 5 is a schematic drawing showing the electric gripper system driving the gripper mechanism to move under an absolute position mode.

FIG. 4 is a flowchart of how the absolute cumulative position is updated. In Step S32, the control segment 36 first determines whether the gripper mechanism 100 is moving under the absolute position mode. If yes, the method goes to Step S33 where the absolute cumulative position is updated. Otherwise, the method goes to Step S34. Referring to FIG. 5, the gripper mechanism 100 as depicted is moving in the directions indicated by the arrows.

Figure 6:
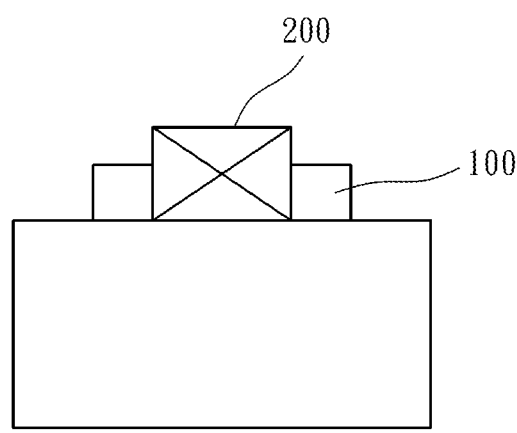
FIG. 6 is a schematic drawing showing the electric gripper system driving the gripper mechanism to hold a workpiece.

In Step S34, the control segment 36 determines whether the gripper mechanism 100 is moving under the gripping mode. When the result is positive, the method goes to Step S35 to update the absolute cumulative position. Otherwise, the method goes to Step S33. Referring to FIG. 6, the gripper mechanism 100 as depicted is moving under the gripping mode and holding a workpiece 200.

In Step S35, when the control segment 36 determines that the gripper mechanism 100 acts abnormally, the method goes back to Step S33 for updating the absolute cumulative position. Otherwise, the method goes to Step S36 to end the process of updating the absolute cumulative position. The reason why the gripper mechanism 100 acts abnormally during its movement may include being blocked by external objects or getting jammed.

In Step S33 for updating the absolute cumulative position as described above, the current position of the gripper mechanism 100 currently generated by the sensor 20 is stored into the accessible segment 34. The current position replaces the absolute cumulative position previously stored in the accessible segment 34. In other words, the absolute cumulative position is updated into the current position of the gripper mechanism 100.

By the previously discussed steps, the absolute cumulative position of the gripper mechanism 100 can be consistently updated while the gripper mechanism 100 is moving without causing interference to the movement of the gripper mechanism 100. With the absolute cumulative position that is always updated, the gripper mechanism 100 is enabled to move to the target position more accurately.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A control method for controlling an electric gripper system comprising a motor, being configured to drive a gripper mechanism; a sensor, being assembled onto the motor and generating a current position according to a position of the gripper mechanism; and a controller being configured to function as a control segment, a transceiver segment, an accessible segment, and a driving segment; the controller being connected to the sensor, the transceiver segment generating a relative-position command value, the accessible segment storing an absolute cumulative position; the control segment reading the relative-position command value, the absolute cumulative position, and a current position, the control segment generating a target position based on the relative-position command value and the absolute cumulative position, the control segment generating a driving datum based on the current position and a target position and on a rotation rate of the motor; the driving segment reading the driving datum so as to drive the motor to move the gripper mechanism, the method comprising the following steps:

a) the control segment receiving the relative-position command value from the transceiver segment, and obtaining the absolute cumulative position from the accessible segment, and the control segment generating the target position based on the relative-position command value and the absolute cumulative position;

b) the control segment receiving the current position generated by the sensor, and calculating a distance between the current position and the target position, the control segment generating the driving datum based on the distance between the current position and the target position and on the rotation rate of the motor;

c) the driving segment receiving the driving datum, the driving segment driving the motor according to the driving datum to make the gripper mechanism move toward the target position; and d) the control segment determining whether the gripper mechanism has entered a positioning range, and when the gripper mechanism has entered the positioning range, determining that the gripper mechanism has been positioned; otherwise, returning to Step b), wherein in Step d), when the control segment determines that the gripper mechanism has not entered the positioning range, an update-absolute-position accumulating process is performed, in the update-absolute-position accumulating process, when it is determined that the gripper mechanism is moving under an absolute position mode, moving under a gripping mode, or acting abnormally, the current position of the gripper mechanism being stored in the accessible segment so that the current position replaces the absolute cumulative position previously stored in the accessible segment, thereby updating the absolute cumulative position into the current position of the gripper mechanism, and wherein in Step a), when the control segment obtains the relative-position command value and the absolute cumulative position, the control segment overwrites the absolute cumulative position of the accessible segment with a sum of the relative-position command value and the absolute cumulative position, so as to update the absolute cumulative position into the sum of the relative-position command value and the absolute cumulative position.

2. The control method of claim 1, wherein when the update-absolute-position accumulating process is performed, it is first to determine whether the gripper mechanism is moving under the absolute position mode, and if a negative result is obtained, it is then to determine whether the gripper mechanism is moving under the gripping mode, and if a negative result is again obtained, it is then to determine whether the gripper mechanism is acting abnormally, and if a negative result is obtained, the update-absolute-position accumulating process is ended.

3. The control method of claim 1, wherein the positioning range is a specification tolerance of the workpiece.

4. The control method of claim 1, wherein the driving datum is an acceleration curve of the motor.

* * * * *